Figure 1:
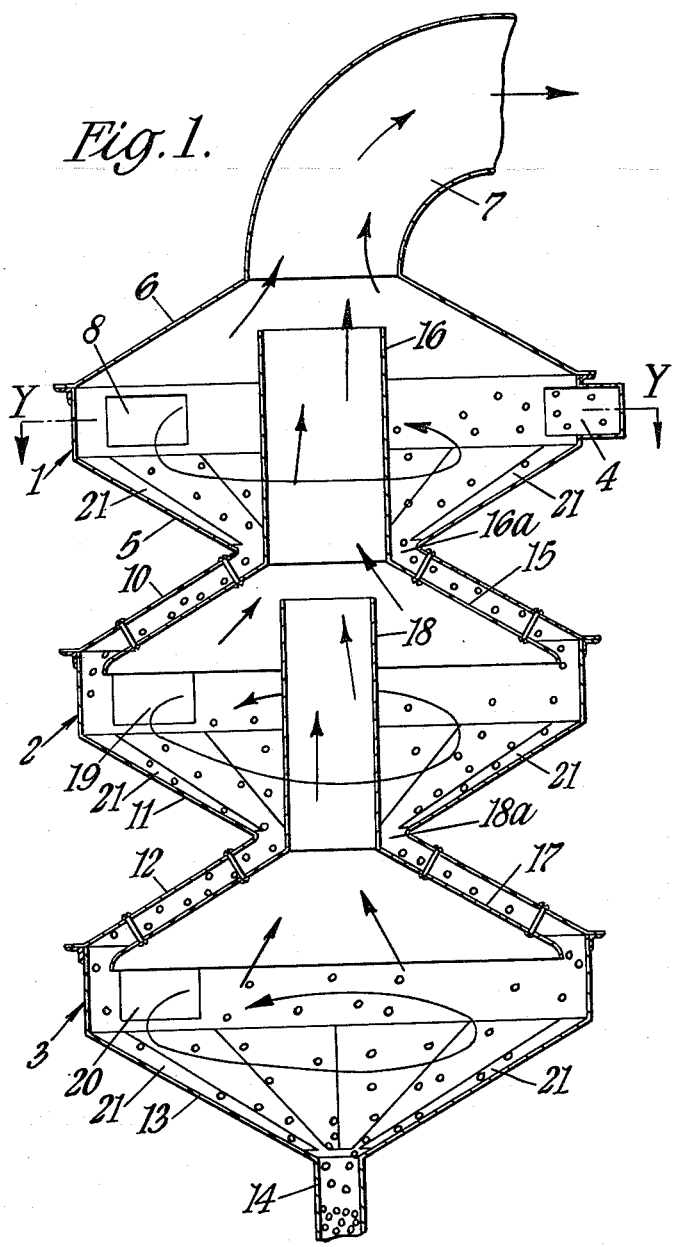

Inventor
CHRISTOPHER L. SAINTY
by Hall & Houghton
Attorney

May 29, 1962

C. L. SAINTY 3,036,333

MANUFACTURE OF PELLETS OF DISCRETE BODIES
FORMED FROM EXTRUDED CLAY AND
SIMILAR MATERIAL

Filed Feb. 17, 1961

4 Sheets-Sheet 3

Inventor,
CHRISTOPHER L. SAINTY,
by Hall Houghton
Attorney.

Inventor,
CHRISTOPHER L. SAINTY
by Hall & Houghton
Attorney.

3,036,333
MANUFACTURE OF PELLETS OF DISCRETE BODIES FORMED FROM EXTRUDED CLAY AND SIMILAR MATERIAL
Christopher Lawrence Sainty, Hassocks, England, assignor to Structural Concrete Components Limited, Hassocks, England
Filed Feb. 17, 1961, Ser. No. 89,946
Claims priority, application Great Britain Feb. 18, 1960
11 Claims. (Cl. 18—1)

This invention relates to the manufacture of pellets or discrete bodies (hereinafter referred to as pellets) formed from extruded clay, shale and like argillaceous materials and suitable for use, when fired, as aggregate in concrete and similar settable mixtures. British Patent No. 803,823 describes the formation of such pellets including the step of treating severed portions of extruded material in a heated rotary tumbler for the purpose of imparting to them a rounded or roughly spherical shape. Experience has shown that pellets so produced do not always achieve a satisfactory structure in the fired product. It appears likely that this is caused by the formation of a compacted skin on the pellets in the tumbler which skin, when the pellets are fired, differs physically and chemically from the interior and may become partially or wholly detached therefrom. The object of the present invention is to provide a method and apparatus for the treatment of the soft or mouldable pellets which obviates the above defect.

The invention consists in the method of treating pellets or discrete bodies of the kind described which comprises propelling the pellets or bodies in a soft and kneadable condition by an air stream whilst guiding the propelled pellets or bodies in circular or downward spiral paths, and subjecting the pellets or bodies in such guided paths to successive radially inward and outward displacements to impart a rolling motion accompanied by successive impacts to the pellets or bodies so that they are both kneaded and formed to a roughly spherical shape.

The invention also consists in the method according to the preceding paragraph comprising drying the treated pellets or bodies under controlled conditions, preferably by causing them to flow through a drying zone by gravity in a consecutive series of alternately oppositely directed paths inclined at an angle sufficient to provide uniform flow and intermixture of the pellets or bodies, controlling the rate of flow of said pellets or bodies by intermittently retarding them in their inclined paths, and passing heated air or gas in counter-flow direction through the pellets in their inclined paths.

The invention also consists in apparatus for carrying out the method according to the preceding paragraph but one, comprising a vertically disposed chamber of generally circular horizontal section, one or more tangential inlets to said chamber, an upper central air outlet for connection to suction means such as a fan or blower whereby pellets or bodies fed to an inlet are caused to follow generally circular or downward spiral paths to an outlet, said chamber being provided with circumferentially spaced deflecting surfaces shaped to impart successive inward displacements to the pellets or bodies followed by outward placements productive of impacts. Preferably the chamber comprises a cylindrical portion having a reduced section or tapered lower part and the deflecting surfaces are provided in the said lower part. Said deflecting surfaces are preferably curved to impart progressive inward displacements followed by a step or shoulder to provide an impact effect. Two or more chambers may be disposed one above the other, the pellets from an upper chamber passing by gravity into the chamber below it, preferably over a conical baffle which guides the pellets to the outer region of the chamber.

The invention also consists in apparatus according to the preceding paragraph combined with a drier having a casing for receiving treated pellets and comprising a series of inclined surfaces down which the pellets flow by gravity to an outlet, an intermittently acting retarding device or flap valve for controlling said flow, and means for passing heated air or gas through the pellets on the inclined surfaces, the latter being preferably arranged in vertical zig-zag formation. Preferably a spring loaded automatic valve is provided to control the entry of pellets to the drier, and the uppermost inclined surface is flexible or displaceable to deflect under the pellet load and to actuate a switch controlling the drive of the retarding device or valve.

Figure 2:
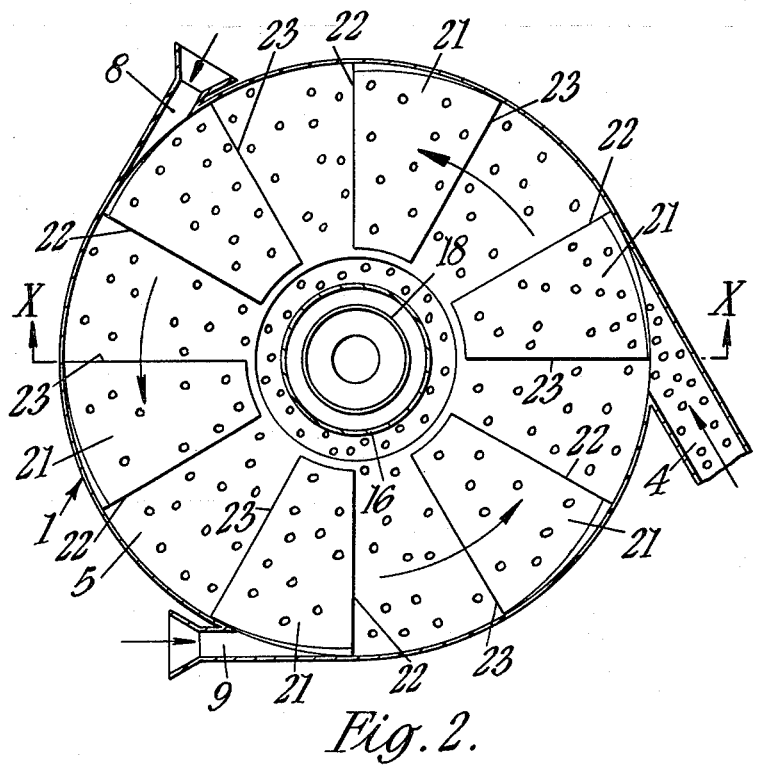
Figure 3:
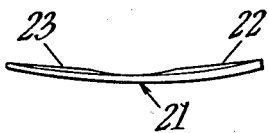
Figure 4:
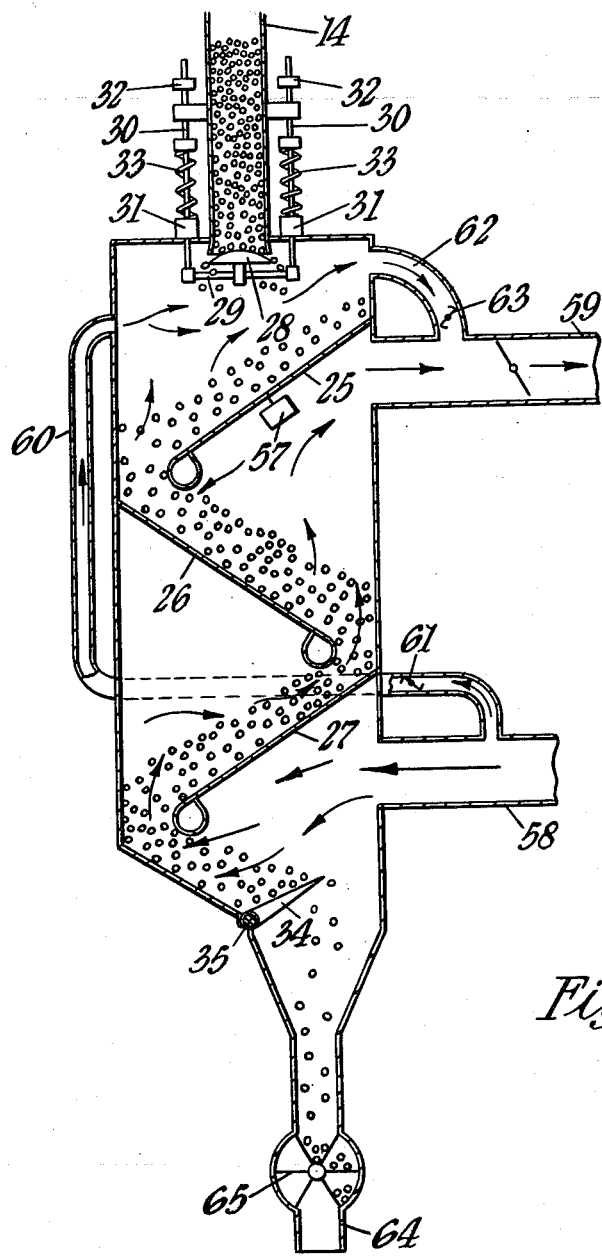
Figure 5:
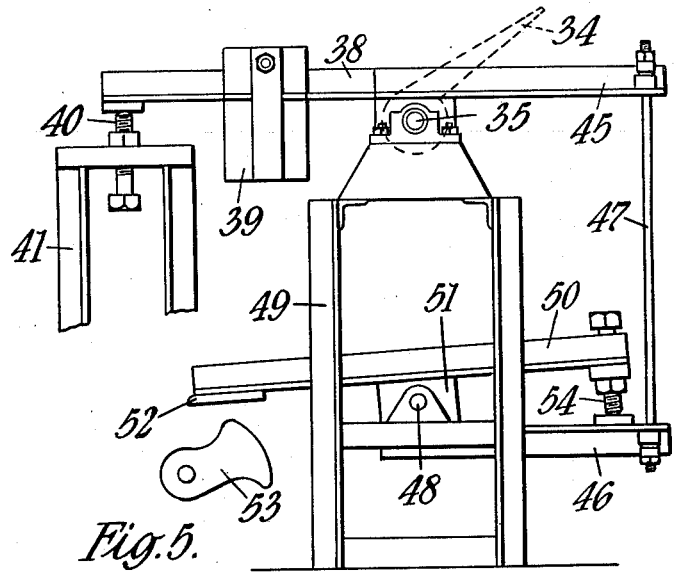
Figure 6:
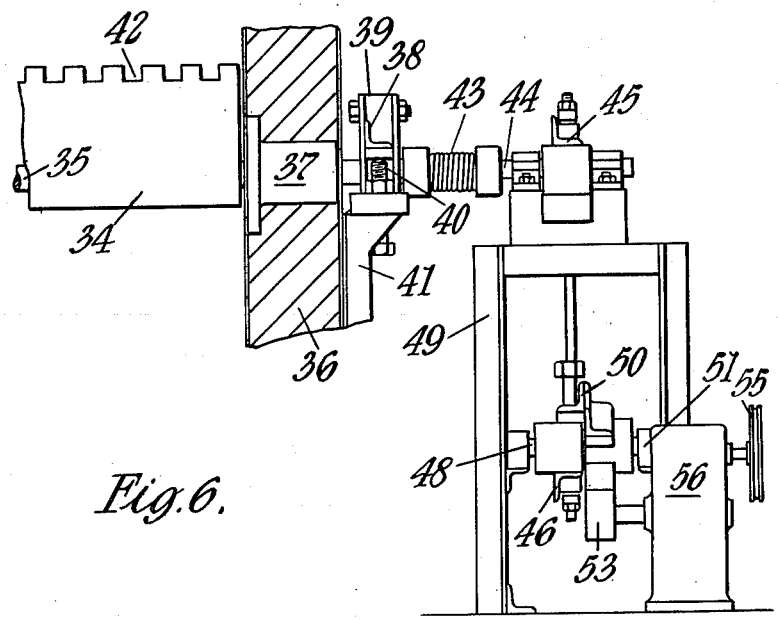

In the accompanying drawings:
FIGURE 1 is a vertical section of a treatment apparatus constructed and operating in accordance with one form of the invention, taken on the line X—X of FIGURE 2;
FIGURE 2 is a horizontal cross section of the apparatus taken on the line Y—Y of FIGURE 1;
FIGURE 3 is an end view of one of the deflecting surface members of FIGURES 1 and 2;
FIGURE 4 is a vertical section of a drying apparatus for use in conjunction with the treatment apparatus of FIGURES 1 and 2;
FIGURES 5 and 6 are respectively end and side views of mechanism for operating an automatic valve in the drying apparatus of FIGURE 4.

In carrying the invention into effect according to one convenient mode, described by way of example, there is provided an apparatus for the treatment of pellets of argillaceous material in softened or kneadable condition which may conveniently be produced by an apparatus as described in British patent specification No. 803,823 (omitting the heated rotary tumbler) or alternatively, by other means. Operation of the treating apparatus is based on a modification of the principle of the well known cyclone separator. Referring to FIGURES 1 and 2, the apparatus comprises a vertically disposed series of cylindrical chambers, indicated generally at 1, 2 and 3. The chamber 1 has a tangentially disposed inlet duct 4 for pellets and a downward extension 5 of inwardly tapering form. An upwardly tapering cover 6 is connected to a suction duct 7 of relatively large cross section. Additional tangentially disposed inlet ducts for air are provided at 8 and 9. The downward extension 5 of the chamber 1 leads to an opening in the cover 10 of the chamber 2 which is shaped in the same way as the chamber 1 and has a downward extension 11 leading similarly to an opening in the cover 12 of the chamber 3. The downward extension 13 of the chamber 3 leads to a pellet outlet duct 14. Pellets descending from the uppermost chamber 1 are guided to the next lower chamber 2 by a conical baffle 15 having an opening at its upper end leading to a vertical duct 16 the upper end of which is aligned with but vertically spaced from the outlet duct 7. Similarly, pellets descending from the chamber 2 to the lowest chamber 3 are guided by a conical baffle 17 having an opening at its upper end leading to a vertical duct 18 the upper end of which is aligned with but vertically spaced from the lower end of the duct 16. The diameter of the duct 16 is greater than that of the duct 18, and the diameter of the outlet duct 7 is greater than that of the duct 16. The chamber 2 has a tangentially disposed air inlet duct 19 similar to the duct 2 of the chamber 1, and the chamber 3 has a similar air inlet duct 20. It is to be understood that these chambers may have more than one tangential inlet duct if desired. The tapered or conical extensions 5, 11 and 13 of the three chambers are provided with attached sector shaped plates 21 circumferentially spaced. These plates are of curved section across their circumferential width as seen in FIGURE 3 and are of downwardly tapering form, and they are disposed at a small inclination about one of their radial edges to the general curved surfaces of the chamber extensions 5, 11 and 13. This disposition is such that one of the downwardly inclined edges 22 of each of the plates 21 forms a step or shoulder about 3/16" deep which is normal to the cone surface at this part of the chamber, the opposite edge 23 being substantially level with the said cone surface. The plates 21 may be cast or formed from sheet metal.

A suction fan is connected to draw air from the outlet duct 7, and the arrangement is such that air drawn in through the pellet inlet 4 and the air inlets previously described causes pellets fed to the inlet 4 to follow circular and downward spiral paths towards the outlet at the base of the chamber 1. Pellets carried by the air stream engage the walls of the chamber and tend to roll thereon. In their downward spiral paths the pellets engage and roll over the conical surface of the chamber extension 5 and over the spaced deflecting plates 21 thereon. The pellets engage the plates 21 at their substantially level edges 23 and are deflected inwardly along a smooth curved path. Upon reaching the step or shoulder 22 the pellets are impelled by centrifugal force to strike the wall 5 of the chamber adjacent to the said step or shoulder. Thus as the pellets follow curved paths of decreasing radius in their downward motion they are subjected to successive impacts and also to a rolling motion on the wall and deflecting surfaces of the chamber. From the upper chamber 1 the pellets fall by gravity through the annular space 16a surrounding the vertical duct 16 and over the baffle 15 into the second chamber 2 in which they are similarly treated under the action of the air stream entering the air inlet 19. The pellets then fall by gravity through the annular space 18a into the third and lowest chamber 3 where the same mode of treatment is effected, the pellets leaving through the outlet duct 14.

It is well recognized that argillaceous materials in a mouldable state are most readily worked and compacted by impacts, and it is found that the procedure described above results in a satisfactory uniformity and absence of lamination in the structure of the pellets as well as a suitable rounded or roughly spherical shape. The treated pellets accumulate in the outlet duct 14 and are drawn off as required, the said outlet duct being of sufficient length to afford a seal against inward leakage of air.

The velocity at which the pellets enter the chambers 1, 2 and 3 and the chamber dimensions may be varied in accordance with the nature of the pellet material and the forces it will withstand without becoming unduly distorted or flattened. As an example, the velocity of the air entering the chamber 1 is between 10,000 and 20,000 feet per minute, the air being exhausted at a relatively low speed through the duct 7. The additional air inlets 8, 9, 19 and 20 will generally be of considerably smaller cross section than the pellet inlet duct 4, and their purpose is to augment the rotary motion of the body of air and pellets. This is necessary where the conveying air entering the pellet inlet 4 is insufficient to work and form the pellets, or where the relationship between the dimensions of the chambers and the quantity of air required for pellet conveying are not compatible with the maintenance of a sufficiently high speed and period of rotation within the respective chambers. It will be understood that whilst in the present example three pellet treatment stages are provided, either more or fewer stages may be provided if required to suit the nature of the pellet material. It is necessary that the pellets should have a substantially dry outer surface or skin before entering the treatment chambers 1, 2 and 3 so that they do not adhere to the chamber walls or coagulate. This outer surface drying is preferably effected in the apparatus described in British Patent No. 803,823, and the pellets require to be fed to the treatment chamber 1 as received from the conveyor of said apparatus to obviate destruction of the dry covering by diffusion of moisture from the interior of the pellets.

Pellets treated in the apparatus described above will generally require to be dried before firing, and a preferred drying apparatus will now be described. Referring to FIGURE 4, the vertical duct 14 from the treatment chamber 3 of FIGURE 1 opens into the upper end of a drier casing 24 of rectangular horizontal section, and provided with inclined surface elements or shelves 25, 26 and 27 which are arranged generally in accordance with the drying apparatus described in British patent specification No. 856,259 so as to provide a zig-zag path down which the pellets travel by gravity. The lower end of the duct 14 is controlled by an automatic valve which opens when the head of pellets above it exceeds a predetermined weight. This valve comprises a disc shaped closure element 28 carried by a cross rod 29 secured to vertically slidable rods 30 mounted in guides 31 and 32, the rods being loaded by springs 33. Downward movement of the pellets under gravity over the inclined surface elements 25, 26 and 27 is controlled by an intermittently operating retarding device or flap 34 secured to a horizontally mounted oscillating shaft 35. Referring to FIGURES 5 and 6, the shaft 35 extends through the wall 36 of the drier casing 24 where it is supported by a bearing 37. An arm 38 attached to the shaft 35 carries an adjustable weight 39 for varying the turning moment on the shaft to be varied. In its rest position the arm 38 rests on a bolt 40 in a fixed frame 41. The outer edge of the flap 34 is serrated at 42. The shaft 35 is connected by a flexible coupling 43 to a second shaft 44 to which is attached an arm 45 connected to a lever 46 by a link 47 having a ball and socket type joint at each end. The lever 46 is attached to a block 47 pivotal on a fixed shaft 48 supported in a frame 49. A second lever 50 secured to a block 51, also rotatable on the shaft 48, carries a shoe 52 arranged to be engaged by a rotary cam 53 to oscillate the lever, motion of which is transmitted to the lever 46 through an adjustable bolt 54. The cam 53 is driven from a pulley 55 through reduction gearing 56. A quick return movement of the flap 34 is obtained as the cam 53 leaves the shoe 52, and is effected by the balance weight 39. The arrangement permits wide variation in the operation of the flap 34, and hence in the flow of pellets, as by varying the speed of the cam and adjustment of the bolts 54 and 40.

The uppermost inclined surface 25 of the drier is either displaceably mounted or alternatively such surface is composed wholly or partially of flexible material so that it deflects downwardly under the pellet load. A micro switch 57 is arranged to be actuated by such deflection under a predetermined pellet load and said switch is connected through a timing device (not shown) to control gear of an electric motor (also not shown) driving the pulley 55, the arrangement being such that operation of the retarding flap 34 is started when a sufficient weight of pellets has accumulated on the inclined surface element 25. The timing device is arranged to operate so that the driving motor will run for a predetermined period whether the micro switch 57 is closed or open, thereby enabling the uppermost surface element 25 to be more or less emptied before the operation of the retarding flap 34 ceases.

Drying of the pellets as they flow down the series of inclined surface elements 25, 26 and 27 is effected by hot air or gas which enters the lower end of the drier 24 from a duct 58 and is extracted from the upper region thereof by a duct 59. The drying air or gas may be derived for example from a furnace employed to fire the dried pellets, or by other means. The arrangement is such that the relatively dry pellets in the lower region of the drier meet the hottest drying medium, and those in the upper region are subjected to lower temperatures and higher humidity. In order to ensure that the relatively soft pellets admitted to the upper inclined surface element 25 of the drier shall flow smoothly by gravity, a proportion of the hottest drying medium is supplied to said region by a branch duct 60 controlled by a damper 61. By this means the entering pellets are slightly surface dried. The major proportion of the drying medium is extracted by the main duct 59 from the region below the surface element 25. A smaller extraction duct 62 controlled by a damper 63 leads from the top of the casing 24 to the main duct 59. The flow of drying medium is shown by the arrows, and it will be understood that drying may be effected by hot air supplied from a directly fired heater if desired. It will be understood that the number of inclined surfaces or shelves required will be determined by the nature of the clay or like material.

The dried pellets are discharged through a duct 64 controlled by a rotatable multiple vane or pocketed valve 65 to prevent inward leakage of air.

By this invention there is provided a method and apparatus for the treatment of pellets of argillaceous material which greatly improves the texture and physical properties thereof so as to lead to a more satisfactory fired product for use as an aggregate in concrete and for like purposes. The invention also enables satisfactory pellets to be initially formed from clay in a stiffer condition and containing less water than has hitherto been practicable, thus economising in the fuel required for drying.

What is claimed is:

1. The method of subjecting discrete bodies of soft and kneadable material to a kneading and forming operation to produce bodies of roughly spherical shape which comprises the steps of initially propelling the bodies by an air stream in a generally horizontal path, positively guiding the propelled bodies in concave paths to impart a rolling motion to said bodies, and positively subjecting the bodies in said concave paths to impacts under the action of centrifugal force involving successive inward and outward displacements relative to the said concave paths to effect a kneading operation on the bodies.

2. Apparatus for subjecting discrete bodies of soft and kneadable material to a kneading and forming operation to produce bodies of roughly spherical shape, comprising at least one vertically disposed chamber of generally circular horizontal cross section, at least one inlet duct leading into the upper part of said chamber and disposed with its axis substantially tangential with the chamber wall, said chamber including circumferentially spaced deflecting surface elements each of curved form and disposed with one edge nearest to the inlet duct substantially level with the chamber wall and an opposite edge spaced radially inwardly from said wall, the intervening inner surface being of concave form, the chamber having an air outlet connection to its upper end and suction means for withdrawing air through said outlet connection, the arrangement being such that bodies fed to said inlet duct are propelled by an air stream produced in said duct by the suction means and follow arcuate paths in rolling contact with the concave deflecting surfaces followed by outwardly directed impacts upon the chamber wall.

3. Apparatus according to claim 2 in which the chamber comprises a cylindrical portion having a reduced section tapered lower part.

4. Apparatus according to claim 2 in which the chamber comprises a cylindrical portion having a reduced section tapered lower part, and the said deflecting surface elements are disposed in said lower part.

5. Apparatus according to claim 2 in which the chamber has a downwardly directed conical extension leading to a central outlet duct, and the deflecting surface elements are of downwardly tapering form and are disposed in said conical extension.

6. Apparatus according to claim 2, comprising at least two chambers of generally similar form located one above the other, the upper chamber having a lower central outlet leading to the lower chamber through which outlet the discrete bodies pass by gravity to said lower chamber.

7. Apparatus according to claim 2, comprising at least two chambers of generally similar form located one above the other, the upper chamber having a lower central outlet leading to the lower chamber through which outlet the discrete bodies pass by gravity to said lower chamber, and conical baffle means disposed in said lower chamber adjacent said upper chamber outlet to guide bodies received from said upper chamber to an outer region of the lower chamber.

8. Apparatus according to claim 2, comprising at least two chambers of generally similar form located one above the other, each chamber comprising a cylindrical upper part and a lower part of downwardly and inwardly tapering conical form, the deflecting surface elements being disposed in the lower part of each of the chambers, the lower part of the upper chamber having an annular outlet leading to the upper part of the lower chamber, and a conical baffle disposed within the upper part of the lower chamber to define the inner perimeter of said annular outlet and to guide bodies passing by gravity through said outlet to the outer region of the lower chamber.

9. Apparatus according to claim 8, in which the cylindrical upper part of each of the chambers has a cover of upwardly and inwardly directed conical form.

10. Apparatus according to claim 8, in which the cylindrical upper part of each of the chambers below the uppermost chamber has a cover of upwardly and inwardly directed conical form the angle of which is substantially the same as the angle of the conical baffle which lies within and in spaced relation to said cover.

11. Apparatus according to claim 2, comprising at least one additional air inlet leading into the upper part of the chamber and disposed with its axis substantially tangential with the chamber wall, said additional inlet being for the admission of air only.

References Cited in the file of this patent

UNITED STATES PATENTS

| 1,554,780 | Berrigan et al. | Sept. 22, 1925 |
| 2,575,119 | Peebles et al. | Nov. 13, 1951 |
| 2,641,044 | Bearer | June 9, 1953 |
| 2,880,519 | Pollock | Apr. 7, 1959 |
| 2,911,669 | Beckwith | Nov. 10, 1959 |
| 2,948,534 | Huszar | Aug. 9, 1960 |

FOREIGN PATENTS

| 803,823 | Great Britain | Nov. 5, 1958 |